C. W. DAYTON.
PROCESS OF PRESERVING HONEY.
APPLICATION FILED SEPT. 14, 1909.
1,000,240.
Patented Aug. 8, 1911.
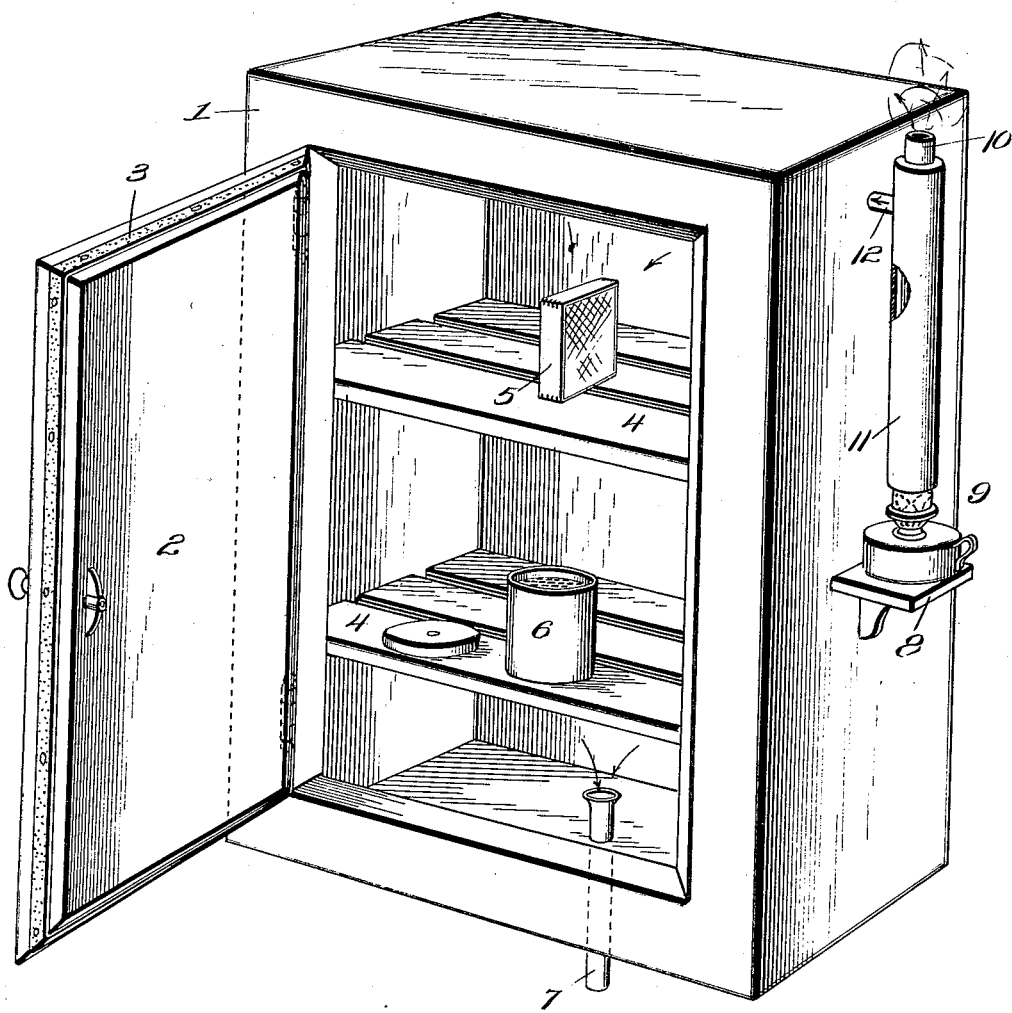

UNITED STATES PATENT OFFICE.

CLYDE W. DAYTON, OF CHATSWORTH, CALIFORNIA.

PROCESS OF PRESERVING HONEY.

1,000,240.  Specification of Letters Patent.  Patented Aug. 8, 1911.

Application filed September 14, 1909. Serial No. 517,682.

*To all whom it may concern:*

Be it known that I, CLYDE W. DAYTON, a citizen of the United States, residing at Chatsworth, in the county of Los Angeles and State of California, have invented new and useful Improvements in Processes of Preserving Honey, of which the following is a specification.

This invention relates to a process of preserving honey, both liquid honey and honey in the comb, as hereinafter described and claimed.

Honey for its safe keeping requires an atmosphere which is warm, dry and changeable in temperature. Usually strained honey is kept in tightly sealed containers and honey in combs is kept in storage cases on which the covers are securely nailed, thus shutting out all the ventilation. Under such conditions, if the honey is subjected to even a moderate degree of cold, moisture becomes expelled from the substance of the honey and at the next rise of temperature moisture collects on the surface of the honey. If the atmosphere is too humid to absorb the moisture arising from the honey, the moisture readily joins with the atmospheric moisture and the depth of the thin waterly liquid on the surface of the honey increases. Ferment fungi are propagated and are exactly suited to flourish under such conditions. The same result follows if the honey be kept in tightly sealed containers because the moisture on the surface of the honey and in which ferment fungi are propagated can not evaporate and pass off.

In accordance with my improved process, I preserve honey by periodically evaporating the watery liquid which forms thereon, thus destroying the atmospheric fungi on the surface of the honey and this I do by exposing the same to the action of an atmosphere to which a current of dry, heated air is supplied, which dry, heated air absorbs the moisture from the air surrounding the honey and causes evaporation of the watery liquid on the surface of the honey in which the atmospheric fungi are propagated.

The accompanying drawing is a perspective of an inclosing box or chamber provided with means for carrying my improved honey preserving process into effect.

The box or chamber 1 which may be of any suitable construction is provided with a door 2 which is provided with means at its edges such as packing 3 for tightly sealing the door when it is closed so as to exclude atmosphere from the box or chamber. The latter is here shown as provided with shelves 4 on which honey in combs as at 5 or in jars or other suitable containers 6 may be placed. A pipe 7 leads from the bottom of the box or chamber. The box or chamber is further provided with means for supplying dry heated air thereto. In the embodiment of the invention here shown, there is a bracket 8 on one side of the box or chamber on which is placed a lamp 9. The chimney 10 of the lamp passes through an air heating drum 11 which is open at its lower end and closed at its upper end and is provided near its upper end with a supply pipe 12 which discharges into the upper portion of the box or chamber.

In carrying out my improved process, the honey in combs or in containers is placed in the box or chamber and if in containers, the latter are uncovered. Periodically, say once every twenty four or forty eight hours, according to the weather and the atmosphere, and in the morning, say between the hours of seven and ten o'clock, the lamp is lighted so as to cause air to be heated in the drum 11 and supplied to the upper portion of the box or chamber and above the level of the honey through the pipe 12. This air is heated to a temperature of not less than 70° and not more than 90° F., passes downward through the closed chamber and finally exhausts through the outlet or vent 7, arranged below the level of the honey. The exhaust of the heated air through this vent 7 induces a down-draft of the heated air supplied through the inlet 12, whereby a continuous downward circulation of the air is set up. The heated air, being thirsty for moisture, absorbs the moisture from the air in the box or chamber, thus causing an evaporation from the surface of the honey, which evaporation facilitates the elimination of the gas resulting from the natural ferment within the body of the honey and also causes the destruction of the atmospheric fungi on the surface of the honey. This process is continued until all of the moisture has been evaporated from the surface of the honey, the temperature of the air being varied within the limits prescribed according to the atmospheric conditions and amount of watery liquid resulting from the moisture expelled by cold from the substance of the honey or deposited on the surface of the honey by condensation of liquid from the atmosphere. After each course of treatment, the honey is allowed to ferment, and the process is then repeated at the intervals stated until fermentation ceases and all the watery matter is exuded, and the atmospheric fungi destroyed, when the honey is ready for sale and use.

What is claimed is:—

The herein described process of curing and preserving honey, which consists in placing the honey with one or more of its surfaces uncovered in a closed chamber, supplying hot air to the interior of said chamber at a point above the level of the honey, continuing the supply of hot air until the atmosphere within the chamber is at a temperature not less than 70° and not greater than 90° F. and all exuding moisture is evaporated from the surface of the honey, inducing a down-draft of the moisture laden air to exhaust the same from the chamber below the level of the honey, and repeating such course of treatment periodically, i, e., once every twenty-four or forty-eight hours, until the honey ceases to ferment.

In testimony whereof I affix my signature in presence of two witnesses.

CLYDE W. DAYTON.

Witnesses:
   CARL I. IVERSON,
   STERLING MONROE THRASHER.